(12) United States Patent
Chen et al.

(10) Patent No.: US 10,229,129 B2
(45) Date of Patent: Mar. 12, 2019

(54) METHOD AND APPARATUS FOR MANAGING TIME SERIES DATABASE

(71) Applicant: International Business Machines Corporation, Armonk, NY (US)

(72) Inventors: Xiao Yan Chen, Beijing (CN); Yao Liang Chen, Beijing (CN); Sheng Huang, Shanghai (CN); Kai Liu, Beijing (CN); Guo Rong Sun, Beijing (CN); Chen Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 14/492,423

(22) Filed: Sep. 22, 2014

(65) Prior Publication Data
US 2015/0095381 A1 Apr. 2, 2015

(30) Foreign Application Priority Data
Sep. 27, 2013 (CN) .......................... 2013 1 0452861

(51) Int. Cl.
*G06F 17/30* (2006.01)
*G06Q 10/06* (2012.01)

(52) U.S. Cl.
CPC .. *G06F 17/30091* (2013.01); *G06F 17/30144* (2013.01); *G06F 17/30365* (2013.01); *G06F 17/30386* (2013.01); *G06Q 10/067* (2013.01)

(58) Field of Classification Search
CPC ......... G06F 17/30091; G06F 17/30144; G06F 17/30365; G06F 17/30386; G06Q 10/067
See application file for complete search history.

(56) References Cited

U.S. PATENT DOCUMENTS 5,412,806 A * 5/1995 Du .................... G06F 17/30545
8,346,761 B2 1/2013 Muras
(Continued)

FOREIGN PATENT DOCUMENTS

CN 101232422 A 1/2008
CN 101984421 A 3/2011
(Continued)

OTHER PUBLICATIONS

First Office Action dated Jul. 4, 2017 in counterpart Chinese Office Action No. CN2013104528619 filed Sep. 27, 2013.
(Continued)

*Primary Examiner* — Taelor Kim
(74) *Attorney, Agent, or Firm* — Tutunjian & Bitetto, P.C.; Vazken Alexanian

(57) ABSTRACT

A method for managing a time series database, includes: monitoring multiple operations that access the time series database, so as to identify types of the multiple operations, the types of the multiple operations comprising at least one of the query types or insert types; with respect to a storage mode among multiple storage modes, obtaining costs that the multiple operations access the time series database based on the types, respectively; selecting a storage mode with the minimum cost from the multiple storage modes; and during a predetermined time period, storing into the time series database data values that are collected from multiple measurement points according to the selected storage mode. In one embodiment, there is provided an apparatus for managing a time series database. By means of the method and apparatus of the present invention, the storage and query efficiency with respect to the time series database can be increased.

20 Claims, 7 Drawing Sheets

(56) References Cited

U.S. PATENT DOCUMENTS

| | | |
|---|---|---|
| 8,386,471 B2 | 2/2013 | Collins |
| 2012/0323884 A1 | 12/2012 | Draese et al. |
| 2013/0066882 A1 | 3/2013 | Westbrooke |
| 2016/0055186 A1* | 2/2016 | Courtney ............ G06F 3/0605 707/752 |

FOREIGN PATENT DOCUMENTS

| | | |
|---|---|---|
| CN | 102591593 A | 7/2012 |
| CN | 102609504 A | 7/2012 |
| CN | 102855391 A | 1/2013 |
| WO | 2013096887 A1 | 6/2013 |

OTHER PUBLICATIONS

Office Action dated Mar. 5, 2018 in counterpart Chinese Office Action No. CN2013104528619 filed Sep. 27, 2013.

\* cited by examiner

200

| 212 Serial Number | 214 Measurement Point ID | 216 Time | 218 Data Value |

METHOD AND APPARATUS FOR MANAGING TIME SERIES DATABASE

FIELD OF THE INVENTION

Various embodiments of the present invention relate to database management, and more specifically, to a method and apparatus for managing a time series database.

BACKGROUND

With the development of technologies such as computer, data communication, real-time monitoring, time series databases have been applied in various aspects such as equipment monitoring, production line management, financial analysis and so on. A time sequence refers to a set of measured values arranged in chronological order. A time series database refers to a database for storing these measured values. Measured values may include various data. For example, in an application environment of bridge monitoring, collected data may include pressure intensity data collected by a certain sensor; in an application environment of weather forecasting, collected data may include temperature, humidity, pressure, wind force (e.g., including force and direction); and in a city's power grid monitoring system, the collected data may include measured values of power consumption of each household in the city, etc.

Generally speaking, as application environments differ, the data collecting frequency and the collection point amount might differ enormously. Regarding massive time series data, the following circumstances may exist: 1) data need to be collected at a high frequency, whereas the amount of measurement points is small; 2) data need to be collected at a low frequency, whereas the amount of measurement points is huge. Since the overall data amount being collected is a product of the collection frequency and the collection point amount, both of the above circumstances will result in massive time series data.

Specifically, in the application environment of monitoring bridge security, for example, it is possible to deploy sensors (e.g., in dozens) at important locations of the bridge, and collect pressure intensity data at each location of the bridge with frequency of 10 times per second; in the power grid monitoring system, it is possible to deploy sensors (e.g., tens of millions) at each household, and collect the power consumption of each household at a frequency of once every 15 minutes. Obviously, the data amount of time series data in conventional application environment is huge.

In addition, as application environments differ, operations performed to collected data also might differ. For example, query operations may exist besides inserting collected data into the database. Regarding the application environment of monitoring bridge security, a conventional query operation is history query that may query data collected from specific sensors within a certain time range (e.g., one hour). For another example, regarding the power grid monitoring system, a conventional query operation is slice query, i.e., when a power company makes statistics on the power consumption of each consumer, it is possible to query in parallel sensors deployed at various households during a shorter time range (e.g., a couple of minutes).

Usually, since time series data consist of massive data and the application of time series databases in all social sectors gets increasingly wider, it becomes a hot research issue regarding how to reduce resource overheads involved in storing and querying data and how to increase the storage and query efficiency of time series data.

SUMMARY

Therefore, it is desired to develop a technical solution that is capable of managing a time series database based on the amount of measurement points, the magnitude of measurement frequency and the type of access to the time series database. Further it is desired that the technical solution can adaptively adjust a management solution based on the recent status of the time series database, so as to enhance the data storage and query efficiency.

According to one aspect of the present invention, there is provided a method for managing a time series database, comprising: monitoring multiple operations that access the time series database, so as to identify types of the multiple operations, the types of the multiple operations comprising at least one of a query type and an insert type; with respect to a storage mode among multiple storage modes, obtaining costs that the multiple operations access the time series database based on the types, respectively; selecting a storage mode corresponding to the minimum cost from the multiple storage modes; and during a predetermined time period, storing into the time series database data values that are collected from multiple measurement points according to the selected storage mode.

In one embodiment of the present invention, there is provided a method for managing a time series database, comprising: storing the collected data values into the time series database according to the method described above; and in response to a query operation to the time series database, reading data from the time series database based on a data storage structure corresponding to the selected storage mode.

In one embodiment of the present invention, there is provided an apparatus for managing a time series database, comprising: a monitoring module configured to monitor multiple operations that access the time series database, so as to identify types of the multiple operations, the types of the multiple operations comprising at least one of a query type and an insert type; an obtaining module configured to, with respect to a storage mode among multiple storage modes, obtain costs that the multiple operations access the time series database based on the types, respectively; a selecting module configured to select a storage mode corresponding to the minimum cost from the multiple storage modes; and a storage module configured to, during a predetermined time period, store into the time series database data values that are collected from multiple measurement points according to the selected storage mode.

In one embodiment of the present invention, there is provided an apparatus for managing a time series database, comprising: a storage module configured to store the collected data values into the time series database according to the method described above; and a reading module configured to, in response to a query operation to the time series database, read data from the time series database based on a data storage structure corresponding to the selected storage mode.

By means of the method and apparatus of the present invention, approaches to storage and query with respect to time series databases can be adjusted adaptively in order to enhance the storage and query efficiency.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 2 schematically shows a schematic view of a data record in a time series database according to one solution;

DETAILED DESCRIPTION

Figure 1:
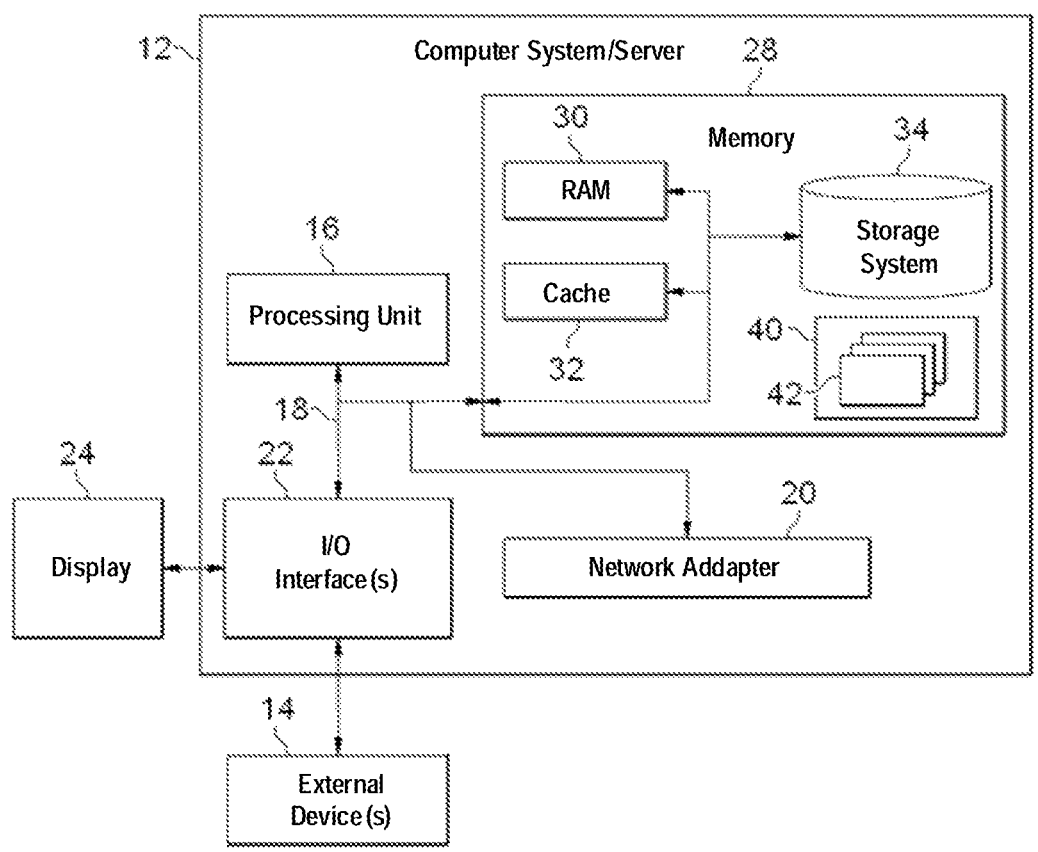
FIG. 1 schematically shows a block diagram of an exemplary computer system/server 12 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, in some embodiments, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, an electromagnetic signal, optical signal, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a block diagram of an exemplary computer system/server 12 which is applicable to implement the embodiments of the present invention is illustrated. Computer system/server 12 illustrated in FIG. 1 is only illustrative and is not intended to suggest any limitation as to the scope of use or functionality of embodiments of the invention described herein.

As illustrated in FIG. 1, computer system/server 12 is illustrated in the form of a general-purpose computing device. The components of computer system/server 12 may include, but are not limited to, one or more processors or processing units 16, a system memory 28, and a bus 18 that couples various system components including the system memory 28 and processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not illustrated in FIG. 1 and typically called a "hard drive"). Although not illustrated in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 may include at least one program product having a set (e.g., at least one) of program modules that are configured to carry out the functions of embodiments of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not illustrated, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Detailed description is presented below to how to store time series data in a database. For example, in the above-described application of monitoring bridge security, measured values (e.g., pressure intensity, etc.) need to be collected from multiple sensors deployed on the bridge at a specific frequency. According to one technical solution, multiple measured values can be stored using an existing relational database. Table 1 below shows an example of a data table that uses a conventional relational database to store measured values.

TABLE 1

Data Table in Relational Database

| Serial No. | Measurement Point | Time | Pressure Intensity |
|---|---|---|---|
| 1 | ID_1 | 15:30:02 | 2.3 Pa |
| ... | ... | ... | ... |
| N | ID_N | 15:30:02 | 3.3 Pa |
| N + 1 | ID_1 | 15:30:03 | 2.1 Pa |
| ... | ... | ... | ... |
| 2N | ID_N | 15:30:03 | 3.2 Pa |
| ... | ... | ... | ... |

As shown in Table 1, the first column shows the serial number of each data record in the data table, the second column "measurement point" denotes the identifier of a sensor from which measured values are collected, the third column "time" denotes collection time, and the fourth column "pressure intensity" denotes the value of pressure intensity that is collected from a specific sensor at specific time. Specifically, for example, the record with a serial number of "1" in the second row denotes: pressure intensity collected from the measurement point "ID_1" at the time "15:30:02" is "2.3 Pa". Suppose N measurement points are deployed on the bridge and the sampling frequency is once per second, then data collected at the time point t1 may be stored in the $1^{st}$ to $N^{th}$ records in proper order, and data collected at the time point t2 may be stored in the $(N+1)^{th}$ to $2N^{th}$ records.

With reference to FIG. 2, this figure schematically illustrates a schematic view 200 of a data record in a time series database according to one solution. Like the example in Table 1, time series data may be stored using a structure as shown in FIG. 2. Specifically, each data record may comprise a serial number 212, a measurement point ID 214, time 216 and a data value 218 being collected. Although data value 218 is shown in only one field in FIG. 2, those skilled in the art should note data value 218 may include different content according to a concrete application environment. For example, in the application environment of weather forecasting, data values may comprise multiple measured values such as temperature, humidity, pressure, and wind force (e.g., including magnitude and direction).

Usually, the data amount of each record in the time series database is not very large, whereas since the amount of measurement points is huge or the sampling frequency is high, the amount of records in the time series database is enormous. However, these data records might contain redundant information. For example, in the $1^{st}$ to $N^{th}$ records in Table 1, all content of the third column "time" is "15:30:02" and thus contains redundancy; when sorted by measurement point, data in the second column "measurement point" also contains redundancy. Therefore, in order to enhance the utilization rate of memories, a new storage structure may be built based on characteristics of the time series database.

In addition, since queries of time sequences have their own peculiarity, when time series data are stored in a conventional relational database, the efficiency of performing data storage and data queries is not satisfactory. Therefore, it is desired to develop a technical solution suitable to store time series data, and it is desired the technical solution can adaptively adjust a method for data storage according to history operations performed to the stored time series data, so as to increase the data storage and query efficiency.

Figure 3:
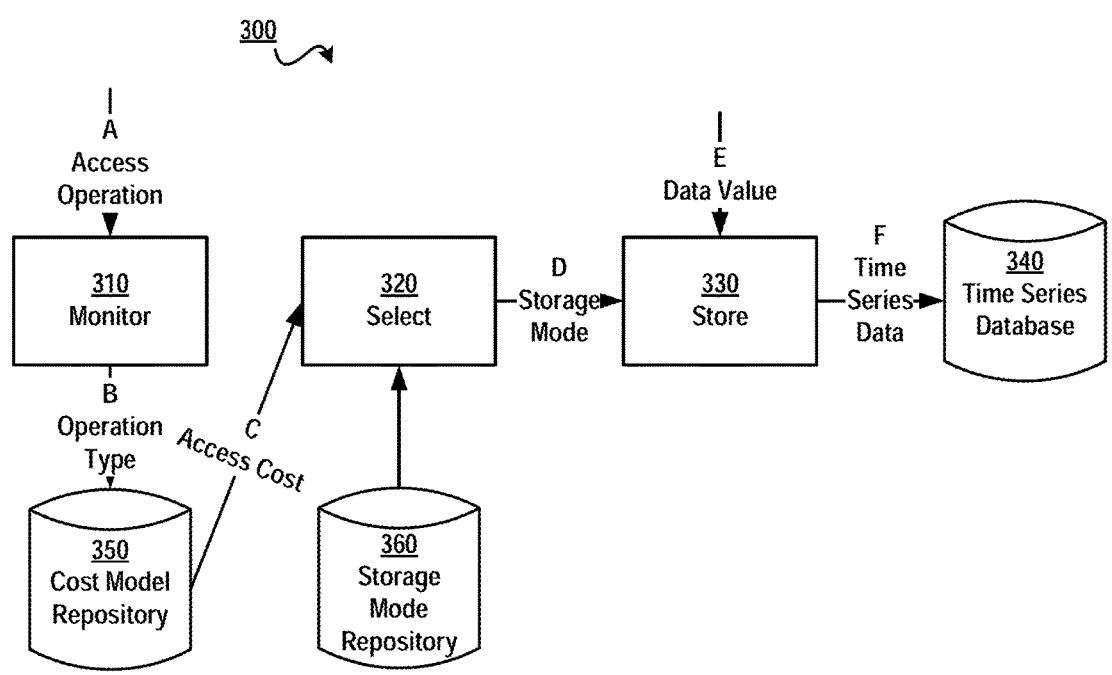
FIG. 3 schematically shows an architecture diagram of a technical solution for managing a time series database according to one embodiment of the present invention.

FIG. 3 schematically illustrates an architecture diagram of a technical solution for managing a time series database according to one embodiment of the present invention. According to this embodiment, in block 310 an access operation to the time series data is monitored; the access operation may be implemented in the Structured Query Language (SQL), and may comprise different operation types, such as data insert operation (i.e., write newly collected data values into the database) and query operation (i.e., query data values meeting specific conditions in the database).

The operation type (as shown by arrow B) may be extracted from the access operation (as shown by arrow A), and the access cost (as shown by arrow C) of each operation may be estimated according to a cost model repository 350 associated with various operation types. Next, in block 320, a storage mode (as shown by arrow D) matching the minimum access cost is selected from a predefined storage mode repository 360. In block 330, the selected storage mode is used to store data values (as shown by arrow E) that are collected from various measurement points as time series data into a time series database 340 (as shown by arrow F).

By managing the time series database using the architecture shown in FIG. 3, on the one hand characteristics of the access operation storing data to the database may be considered, on the other hand, characteristics of querying data in the database are taken into account when deciding in which mode data should be stored, thus improving the data storage and query efficiency.

In one embodiment of the present invention, there is provided a method for managing a time series database, comprising: monitoring multiple operations that access the time series database, so as to identify types of the multiple operations, the types of the multiple operations comprising at least one of a query type and an insert type; with respect to a storage mode among multiple storage modes, obtaining costs that the multiple operations access the time series database based on the types, respectively; selecting a storage mode corresponding to the minimum cost from the multiple storage modes; and during a predetermined time period, storing into the time series database data values that are collected from multiple measurement points according to the selected storage mode.

Figure 4:
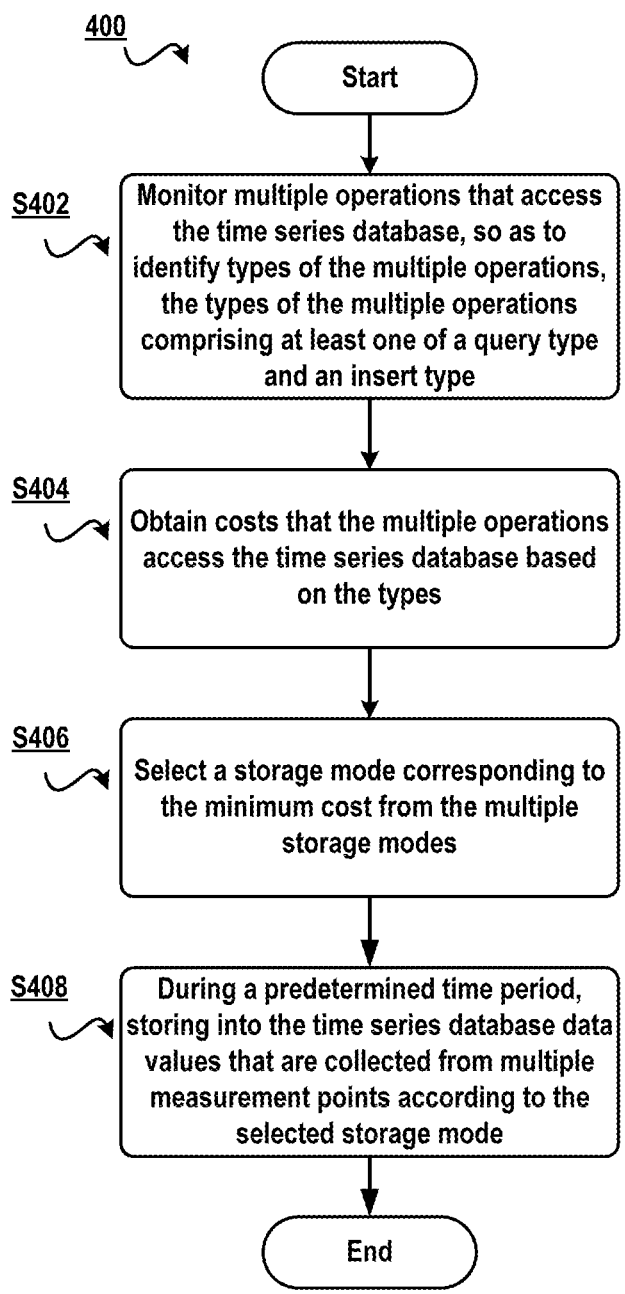
FIG. 4 schematically shows a flowchart of a method for managing a time series database according to one embodiment of the present invention.

With reference to FIG. 4, detailed description is presented below to the embodiment of the present invention. FIG. 4 schematically illustrates a flowchart 400 of a method for managing a time series database according to one embodiment of the present invention. In step S402, multiple operations that access the time series database are monitored, so as to identify types of the multiple operations, the types of the multiple operations comprising at least one of a query type and an insert type.

In the database field, operations performed to databases are usually defined in the SQL language. For example, an operation SQL1 that inserts data values into a database may be "INSERT INTO table1 (point, time, pressure) VALUES (ID_1, '15:30:02', 2.3)." The operation SQL1 is an insert operation (i.e., for storing new data values into a database); specifically, the operation represents one record is to be inserted into a table named table1, wherein values of the columns "point," "time" and "pressure" are ID_1, '15:30:02' and 2.3, respectively.

For another example, an operation SQL2 that queries a database may be "SELECT point, time, pressure FROM table1 WHERE time='15:30:02.'" The operation SQL2 is a query operation, and represents data of records meeting the query condition "time='15:30:02'" are to be queried from the table named table1. Therefore, the types of the operations can be obtained based on analyzing keyword(s) in the multiple operations.

In step S404, with respect to a storage mode among multiple storage modes, obtain costs that the multiple operations access the time series database based on the types, respectively. Those skilled in the art should understand as operation types vary, the amount of required resources to access the time series database also varies.

In this embodiment, multiple storage modes may be predesigned according to operations performed to the database. Each storage mode may be suitable for one type of application environment. For example, a storage mode may be designed with respect to the above-described application environment of monitoring bridge security (data are collected at a higher frequency, while the amount of measurement points is relatively small), and also a storage mode may be designed with respect to the application environment of power grid monitoring (data are collected at a lower frequency, while the amount of measurement points is huge).

With respect to each storage mode among the multiple storage modes, those skilled in the art may design a cost calculation approach, for example, defining a calculation formula with respect to query type and insert type respectively. Specifically, for an insert operation, the access cost may involve the frequency of inserting data into the database, the size of a required buffer area to execute one insert operation, etc.; for a query operation, the access cost may involve the amount of accessed measurement points and a time interval which the query involves. Those skilled in the art may define the cost calculation method based on these parameters.

In step S406, select a storage mode corresponding to the minimum cost from the multiple storage modes. In this embodiment, since the access cost has been calculated based on the access types and storage modes, a storage mode corresponding to the minimum cost may be selected.

Finally, in step S408, during a predetermined time period, data values that are collected from multiple measurement points are stored into the time series database according to the selected storage mode. In this embodiment, the data storage method may be adjusted adaptively according to history operations performed to stored time series data. As an example only, operations that access the database in the last 1 hour may be monitored, so as to determine in which storage mode data are to be stored to the database during a future specific time period (e.g., 1 hour or at longer or shorter intervals).

In one embodiment of the present invention, the method is executed periodically. In this embodiment, to "periodically execute" means a storage mode suitable for current situation may be determined at any time according to the latest information of the access operation. For example, regarding the power grid monitoring system, considering the power consumption varies dramatically in the daytime and at night, to set different measuring frequencies for the daytime and night will result in that frequencies of inserting measured values into the database might vary (i.e., access costs vary), so different storage modes may be selected to store data in the daytime and at night.

In one embodiment of the present invention, the multiple storage modes at least comprise any one of: a group storage mode: based on groups resulting from dividing multiple measurement points by a measurement time period, storing into at least one group data blob data values that are collected at the multiple measurement points during the time period; and a high-frequency storage mode: storing into at least one high-frequency data blob data values that are collected at a measurement point during a time period. The measurement time period mentioned here refers to a time range in which data values are collected at a measurement point. For example, based on a concrete application environment, the measurement time period may be 1 minute, 10 minutes, 1 hour, etc.

Figure 5A:
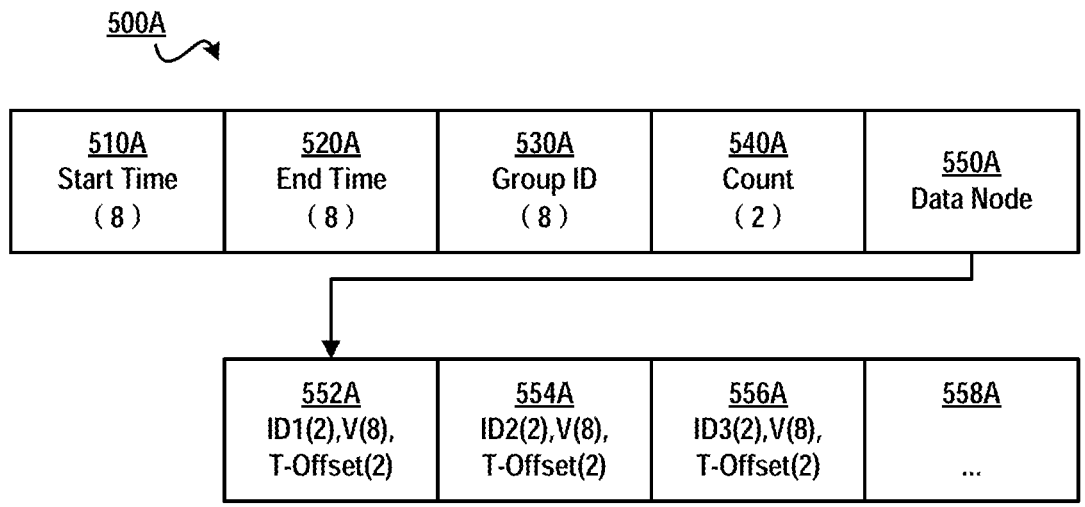
FIGS. 5A and 5B schematically show a schematic view of a data structure of a data blob in a group storage mode and a high-frequency storage mode according to one embodiment of the present invention, respectively.
Figure 5B:
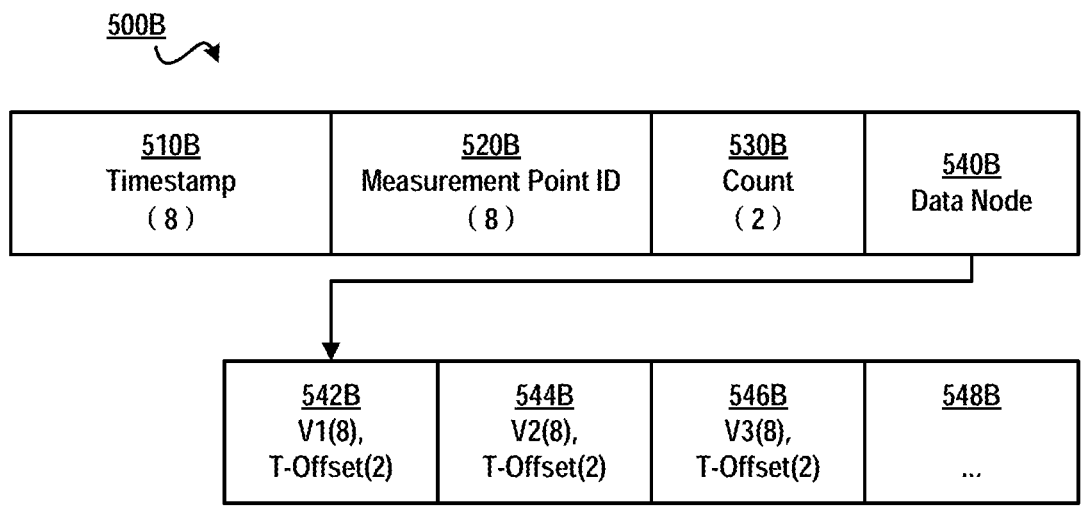

With reference to FIGS. 5A and 5B, details of various storage modes will be described below. FIGS. 5A and 5B schematically illustrates a schematic view of a data structure of a data blob in the group storage mode and high-frequency storage mode according to one embodiment of the present invention, respectively. Note although FIGS. 5A and 5B each only illustrates the data structure of one data blob, in the various embodiments of the present invention, the time series database may separately comprise a plurality of data blobs as shown in FIG. 5A, separately comprise a plurality of data blobs as shown in FIG. 5B, or comprise both kinds of data blobs.

FIG. 5A schematically illustrates a data structure 500A of a data structure of a data blob under group storage mode that is especially applicable to store time series data with a huge amount of measurement points and a low measuring frequency. When executing a slice query, the storage mode has high query efficiency. The principle of the group storage mode is to divide measurement points into multiple groups by time when data values are measured, allocate a unique identifier to each group and record the amount of measurement points in this group.

As shown in FIG. 5A, reference numbers 510A-550A denote a data header portion, wherein a start time 510A and an end time 520A are for denoting the start time and the end time when data are collected at measurement points in a group, a group ID 530A denotes a unique identifier of the group, and a count 540A denotes the amount of measurement points in the group. Note the numeral shown in parentheses in each field in FIG. 5A denotes the length of this field, i.e., comprising how many storage cells. For example, start time 510A may be denoted with 8 storage cells, and count 540A may be denoted with 2 storage cells. Those skilled in the art may define the size of a storage cell by themselves.

In the application environment of a power grid system, suppose the measurement time period is 8:00:00-9:00:00, and then all measurement points in one building may be divided as one group with a group ID of group1. Where the group comprises 100 measurement points, the data header of the data blob may be represented as {8:00:00, 9:00:00, group1, 100} according to the group storage mode. Note the representation is illustrative only, and those skilled in the art may adopt other representation according to a concrete application environment.

In one embodiment of the present invention, in the group storage mode, identifiers of measurement points in the group, at least the collected data values and time offsets are stored in a data node of a group data blob of the at least one group data blob. Specifically, with reference to FIG. 5A, a data node 550A may be multiple data nodes, and the amount of nodes may be equal to a value stored in count 540A. ID of a measurement point, a measured data value, and an offset of the measurement time in relation to the time recorded in start time 510A may be stored in each data node. Specifically, for example, a data node 552A may comprise a measurement point ID1 denoted by 2 storage cells, a data value V denoted by 8 storage cells, and a time offset denoted by 2 measurement cells.

Using the group storage mode as shown in FIG. 5A, when querying data that are measured during a specific time period by slice query, corresponding measurement points and data values can be found quickly through the data blob as shown in FIG. 5A, thereby greatly increasing the query efficiency. If data are organized in this manner, this corresponds to building a database index for slice query in advance, thereby ensuring a higher query efficiency.

FIG. 5B schematically illustrates a data structure 500B of a data blob under high-frequency storage mode that is especially applicable to store time series data with a small amount of measurement points and a higher measurement frequency. When executing history queries, this storage mode has higher query efficiency. The principle of the high-frequency storage mode is to store measured data by measurement points, i.e., data from the same measurement point and collected at different times are stored in each data blob.

A data header of the high-frequency storage mode comprises fields denoted by reference numbers 510B-530B, wherein a timestamp 510B denotes collection time, a measurement point ID 520B denotes from which measurement point data are collected, and a count 530B denotes how many measured values are comprised in the data blob.

In one embodiment of the present invention, in the high-frequency storage mode, at least the collected data values are stored in a data node of a high-frequency data blob of the at least one high-frequency data blob. With reference to FIG. 5B, in the data body portion, as described by reference number 550A in FIG. 5A, a data node 540B may be multiple data nodes, and in each data node there are stored a concrete measured value and an offset of the time when the measured value is collected in relation to the time in timestamp 510B. Note when sampling at a fixed frequency, the collection time of the measured value can be calculated according to timestamp 510B, the location of data node 540B and the fixed frequency, so the offset can be omitted in data node 540B.

Using the high-frequency storage mode as shown in FIG. 5B, when executing history queries, querying data that are measured during a specific time period by slice, corresponding measurement time can be found quickly through the data blob as shown in FIG. 5B, thereby greatly increasing the query efficiency. If data are organized in this manner, this corresponds to building a database index for history query in advance, thereby ensuring a higher query efficiency.

In one embodiment of the present invention, the obtaining costs that the multiple operations access the time series database based on the types comprises: calculating the costs according to a cost model corresponding to the multiple storage modes, based on the types. Each access type may have its own characteristics, and the various storage modes described with reference to FIGS. 5A and 5B are applicable to different access types, respectively. Therefore, the costs for accessing data may be determined based on the access type and the storage mode.

In one embodiment of the present invention, the calculating the costs according to a cost model corresponding to the multiple storage modes comprises at least one of: calculating the costs based on a query cost model in response to a first part of operations among the multiple operations belonging to the query type, wherein the query cost model describes access costs of performing query operations to the database; and calculating the costs based on an insert cost model in response to a second part of operations among the multiple operations belonging to the insert type, wherein the insert cost model describes access costs of performing insert operations to the database.

In one embodiment of the present invention, the multiple operations may only involve query type, or only involve insert type, or involve both types. Inherent characteristics of the access type may be considered as a whole, and data access overheads are evaluated comprehensively. Here the access costs may mainly involve overheads in the data I/O respect when executing insertion/query.

Specifically, when detecting the access operation comprises a keyword "SELECT", the read cost involved in the query operation may be estimated, and the read costs of all query operations may be the sum of the read cost estimated based on each query operation. In addition, when detecting the access operation comprises a keyword "INSERT," the write cost involved in the query operation may be estimated. The cost may involve the sum of all write costs during the time window of writing data to the database.

Figure 6:
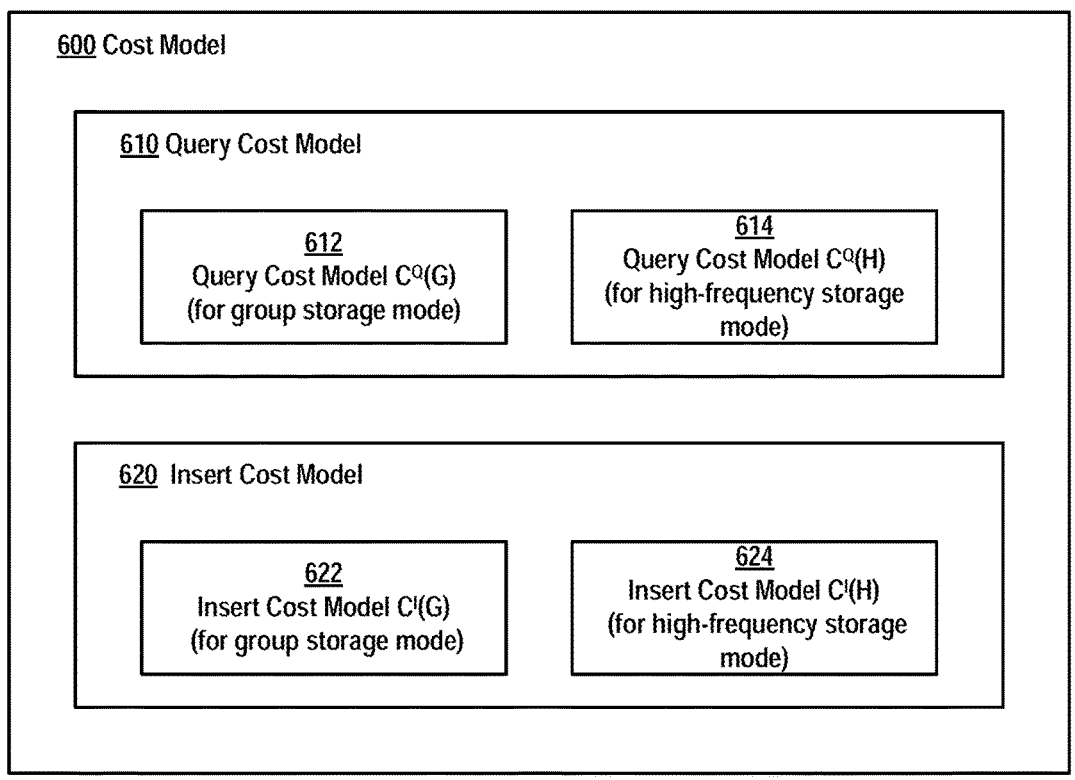
FIG. 6 schematically shows a block diagram of a cost model according to one embodiment of the present invention.

In one embodiment of the present invention, the query cost model and the insert cost model respectively comprise: cost models corresponding to the group storage mode and the high-frequency storage mode, respectively. Specifically, FIG. 6 illustrates a block diagram 600 of a cost model according to one embodiment of the present invention. Cost model 600 may comprise a query cost model 610 and an insert cost model 620, and each cost model comprises cost models with respect to the two storage modes, respectively. For example, query cost model 610 may comprise a query cost model $C^Q(G)$ (as shown by block 612) used for the group storage mode and a query cost model $C^Q(H)$ (as shown by block 614) used for the high-frequency storage mode; insert cost model 620 may comprise an insert cost model $C^I(G)$ (as shown by block 622) used for the group storage mode and an insert cost model $C^I(H)$ (as shown by block 624) used for the high-frequency storage mode. Detailed description is presented below to calculation formulas of various cost models.

In one embodiment of the present invention, the calculating the costs based on a query cost model in response to a first part of operations among the multiple operations belonging to the query type comprises: extracting from the first part of operations the amount $N_D$ of multiple measurement points associated with the first part of operations and the amount $N_T$ of multiple query time points, wherein the first part of operations represent operations of querying in the time series database data values collected from the multiple measurement points at the multiple query time points; and estimating the costs at least based on the amount $N_D$ of the multiple measurement points and the amount $N_T$ of the multiple query time points according to the query cost model.

Those skilled in the art may understand the principle of estimating the I/O cost of a query operation is to determine how many I/O resources need to be invoked for executing each SQL statement in the query operation, while the amount of resources being invoked mainly involves how many storage cells are required to cache data read from the time series database. Note the main I/O cost of the query operation involves the amount $N_D$ of measurement points and data values collected at which time points (with an amount $N_T$) are desired to be queried. Therefore, the I/O cost may be estimated based on these two parameters. Description will be presented below to query cost models used for the group storage mode and the high-frequency storage mode.

In one embodiment of the present invention, the query cost model used for the group storage mode may be represented as:

$$C^Q(G)=(26+12\times B)\times N_T\times \lceil N_D/B \rceil \quad \text{Formula 1}$$

Where $N_T$ represents the amount of time points involved in the query operation, $N_D$ represents the amount of measurement points involved in the query operation, and the batch size B represents the amount of collected data values that may be cached in each data blob (e.g., the data blob with reference to FIG. 5A). When storing data in the group storage mode, since the query operations involve $N_D$ measurement points, $\lceil N_D/B \rceil$ data blobs are required to cache the $N_D$ measurement points. Since $N_T$ time points are involved, a total of $N_T\times\lceil N_D/B \rceil$ data blobs are required to cache target data of the query operation.

In addition, according to the group storage mode, the length of each data blob equals to $((8+8+8+2)+(2+8+2)\times B)$ $=(26+12\times B)$, so it can be seen that the size of I/O resources involved in the query operation equals to $(26+12\times B)\times N_T\times \lceil N_D/B \rceil$. Therefore, the query cost model $C^Q(G)$ used for the group storage mode may be calculated based on Formula 1 described above.

In one embodiment of the present invention, the query cost model used for the high-frequency storage mode may be represented as:

$$C^Q(H)=(18+10\times B)\lceil N_T/B \rceil \times N_D \quad \text{Formula 2}$$

Since one data blob may cache B data values, data values that are collected at one measurement points at $N_T$ time points require $\lceil N_T/B \rceil$ data blobs. In addition, with respect to $N_D$ measurement points, $\lceil N_T/B \rceil \times N_D$ data blobs are required. Like the calculation method described on the basis of Formula 1, under the high-frequency storage mode, the length of each data blob is equal to $((8+8+2)+(8+2)\times B)=$ $(18+10B)$. Therefore, the query cost model $C^Q(H)$ used for the high-frequency storage mode may be calculated based on Formula described above.

In one embodiment of the present invention, the calculating the costs based on an insert cost model in response to a second part of operations among the multiple operations belonging to insert type comprises: extracting from the second part of operations the sampling frequency f of inserting data into the database which is associated with the second part of operations, and the amount $|D_f|$ of measurement points associated with the sampling frequency f, wherein the second part of operations represent inserting data values that are collected from the $|D_f|$ measurement points into the time series database at the frequency f; and estimating the costs at least based on the sampling frequency f and the amount $|D_f|$ according to the query cost model.

Those skilled in the art may understand the principle of estimating I/O costs of insert operations is to determine how many I/O resources need to be occupied for executing each SQL statement in the query operation, while the amount of resources being occupied mainly involves how many storage cells are needed to be written into the time series database. Note the main I/O cost of the write operation involves the sampling frequency f of inserting data into the database and the amount $|D_f|$ of measurement points associated with the sampling frequency f. Therefore, the I/O cost may be estimated based on these two parameters. Description will be presented below to query cost models used for the group storage mode and the high-frequency storage mode.

In one embodiment of the present invention, the insert cost model used for the group storage mode may be represented as:

$$C^I(G) = (26 + 12 \times B) \times \sum_{f \in F} \lceil |D_f|/B \rceil \times f \qquad \text{Formula 3}$$

In one embodiment of the present invention, first of all the multiple measurement points are grouped according to the sampling frequency f, wherein measurement points with the same sampling frequency are divided into the same set $D_f$, and $|D_f|$ is the amount of measurement points whose sampling frequency is f. Next, with respect to each $D_f$, further grouping is conducted, wherein each group consists of B measurement points, so there are $|D_f|/B$ groups with respect to each $D_f$. Relevant data values of measurement points in each group are inserted into one data blob, so the size of this data blob is B.

Therefore, the data amount collected from measurement points in one group every second is B×f, and B*f/B=f data blobs are desired to be generated every second. In Formula 3, the length of each data blob is equal to (26+12×B), and a total of $$\sum_{f \in F} \lceil |D_f|/B \rceil \times f$$

data blobs are required.

Formula 3 will be explained below by way of example. Suppose there exist only one sampling frequency f=2, 1000 sampling points, the maximum write time latency of inserting data into the database is equal to $T_L$=5 seconds, and B=10.

According to the group storage mode, there are 1000/10=100 small groups exist. The data amount collected from measurement points in each group equals to 10×2=20, and 20/10=2 data blobs are needed. Since there are 100 small groups, 100×2=200 data blobs are needed.

In one embodiment of the present invention, the query cost model used for the high-frequency storage mode may be represented as:

$$C^I(G) = (18 + 10 \times B) \times \sum_{f \in F} |D_f| \times \max(\lceil T_L \times f \rceil, B)/T_L \qquad \text{Formula 4}$$

In one embodiment of the present invention, first of all the multiple measurement points are grouped according to the sampling frequency f, measurement points with the same sampling frequency are divided into the same set $D_f$, $|D_f|$ is the amount of measurement points whose sampling frequency is f, and $T_L$ is the maximum write time latency. Each data blob comprises B data values from one measurement point. $\lceil T_L \times f \rceil$ is the maximum amount of data values that are collected from one measurement point before the write time latency expires.

Note even if $\lceil T_L \times f \rceil < B$, it is necessary to fill B data values in data blobs. Therefore, a greater value may be selected, i.e., $\max(\lceil T_L \times f \rceil, B)$. In this manner, all data values that are collected during $T_L$ may be cached in a memory. In other words, a total of $$\sum_{f \in F} |D_f| \times \max(\lceil T_L \times f \rceil, B)$$

data blobs may be cached, and $$\sum_{f \in F} |D_f| \times \max(\lceil T_L \times f \rceil, B)/T$$

data blobs may be cached every second.

Formula 4 may be explained below by way of example. Suppose there exist only one sampling frequency f=2, 1000 sampling points, the maximum write time latency of inserting data into the database is equal to $T_L$=5 seconds, and B=10. According to the high-frequency storage mode, $T_L \times f$=10, i.e., 10 data values maybe cached every second, which equals to the length of one data blobs. Therefore, each measurement point corresponds to one data blob. The total amount of data blobs equals to 1000×10, and (1000×10)/5=2000 data blobs may be cached every second.

According to the high-frequency storage mode, the length of each data blob (the number of storage cells being occupied) equals to ((8+8+2)+(8+2)×B)=(18+10×B), so corresponding costs can be obtained based on Formula 4.

According to the above-described Formulas 1-4, the cost conforming to each cost model can be obtained, and subsequently a storage mode corresponding to the lowest cost can be selected from multiple storage modes, and data are stored in the database based on the selected storage mode.

In one embodiment of the present invention, there is further comprised: monitoring status information of a computer device running the time series database; and revising the cost based on the status information. In this embodiment, the principle of revising the cost based on the status information is to determine in advance whether there exists in the computer device sufficient I/O resources to support data storage in the time series database based on the selected storage mode. Specifically, a system cost model may be defined to represent the size of a required I/O buffer area when each storage mode is used.

In one embodiment of the present invention, the system cost model used for the group storage mode may be represented as:

$$C^S(G) = (26 + 12 \times B) \times \sum_{f \in F} \lceil |D_f|/B \rceil \qquad \text{Formula 5}$$

Wherein there are $$\sum_{f \in F} \lceil |D_f|/B \rceil$$

groups in total, each group caching one data blob whose length equals to (8+8+8+2)+(2+8+2) B=26+12B.

In one embodiment of the present invention, the system cost model used for the high-frequency storage mode may be represented as:

$$C^S(H) = (18 + 10 \times B) \times \sum_{f \in F} |D_f| \quad \text{Formula 6}$$

Wherein there are $$\sum_{f \in F} |D_f|$$

groups in total (each measurement point corresponds to one group), each group caching one data blob whose length equals to (8+8+2)+(8+2) B=18+10B.

In one embodiment, a total cost may be obtained by weighting various costs that are calculated based on the query cost mode, the insert cost model and the system cost model, and then a storage mode applicable to the minimum total cost is selected. For example, a total cost may be calculated based on the formula below:

$$\text{Total}=\arg\min\{(1-\alpha) \times C^I(S) + \alpha \times C^Q(S)\} \quad \text{Formula 7}$$

Where S represents any one of the group storage mode and the high-frequency storage mode, and α represents a value ranging from 0 to 1 which indicates the user's preference on the query (read) cost or insert (write) cost. For example, when α=0.5, which indicates the user considers the query cost and the insert cost equally important; when α=0.1, this indicates the user attaches a higher weight to the query cost.

In one embodiment of the present invention, there is provided a method for managing a time series database, comprising: storing the collected data values in the time series database according to the method described above; and in response to a query operation to the time series database, reading data from the time series database based on a data storage structure corresponding to the selected storage mode.

According to the above-described embodiments, the most suitable storage mode at present is determined according to history operations accessing the time series database. When querying the time series database subsequently, data can be read from the database according to a corresponding mode. Specifically, for example in the application environment of monitoring bridge security, if it is selected to store data based on the data blob as shown in FIG. 5B, then a query operation can be parsed subsequently so as to read data according to a mode suitable for the data blob shown in FIG. 5B.

Figure 7:
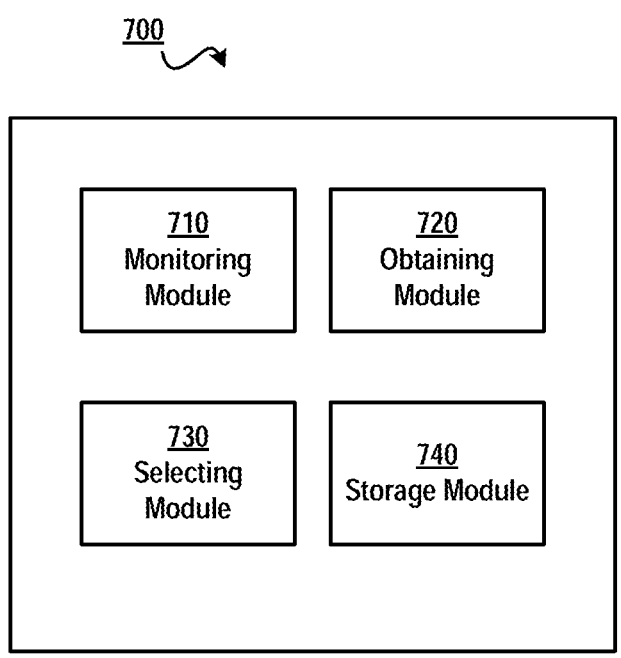
FIG. 7 schematically shows a block diagram of an apparatus for managing a time series database according to one embodiment of the present invention.

FIG. 7 schematically illustrates a block diagram 700 of an apparatus for managing a time series database according to one embodiment of the present invention. As shown in FIG. 7, there is provided an apparatus for managing a time series database, comprising: a monitoring module 710 configured to monitor multiple operations that access the time series database, so as to identify types of the multiple operations, the types of the multiple operations comprising at least one of a query type and an insert type; an obtaining module 720 configured to, with respect to a storage mode among multiple storage modes, obtain costs that the multiple operations access the time series database based on the types, respectively; a selecting module 730 configured to select a storage mode corresponding to the minimum cost from the multiple storage modes; and a storage module 740 configured to, during a predetermined time period, store into the time series database data values that are collected from multiple measurement points according to the selected storage mode.

In one embodiment of the present invention, there is further comprised: a revising module configured to monitor status information of a computer device running the time series database, and revise the cost based on the status information.

In one embodiment of the present invention, the multiple storage modes at least comprise any of: a group storage mode: based on groups resulting from dividing multiple measurement points by a measurement time period, storing into at least one group data blob data values that are collected at the multiple measurement points during the time period; and a high-frequency storage mode: storing into at least one high-frequency data blob data values that are collected at a measurement point during a time period.

In one embodiment of the present invention, obtaining module 720 comprises: a calculating module configured to calculate the costs according to a cost model corresponding to the multiple storage modes, based on the types.

In one embodiment of the present invention, the calculating module comprises at least one of: a first calculating module configured to calculate the costs based on a query cost model in response to a first part of operations among the multiple operations belonging to the query type, wherein the query cost model describes access costs of performing query operations to the database; and a second calculating module configured to calculate the costs based on an insert cost model in response to a second part of operations among the multiple operations belonging to the insert type, wherein the insert cost model describes access costs of performing insert operations to the database.

In one embodiment of the present invention, the first calculating module comprises: a first extracting module configured to extract from the first part of operations the amount $N_D$ of multiple measurement points associated with the first part of operations and the amount $N_T$ of multiple query time points, wherein the first part of operations represent operations of querying in the time series database data values collected from the multiple measurement points at the multiple query time points; and a first estimating module configured to estimate the costs at least based on the amount $N_D$ of the multiple measurement points and the amount $N_T$ of the multiple query time points according to the query cost model.

In one embodiment of the present invention, the second calculating module comprises: a second extracting module configured to extract from the second part of operations the sampling frequency f of inserting data into the database which is associated with the second part of operations, and the amount $|D_f|$ of measurement points associated with the sampling frequency f, wherein the second part of operations represent inserting data values that are collected from the $|D_f|$ measurement points into the time series database at the frequency f; and a second estimating module configured to estimate the costs at least based on the sampling frequency f and the amount $|D_j|$ according to the query cost model.

In one embodiment of the present invention, in the group storage mode, at least identifiers of measurement points in the group, the collected data values and time offsets are stored in a data node of a group data blob of the at least one group data blob; in the high-frequency storage mode, at least the collected data values are stored in a data node of a high-frequency data blob of the at least one high-frequency data blob.

In one embodiment of the present invention, the query cost model and the insert cost model respectively comprise: cost models respectively corresponding to the group storage mode and the high-frequency storage mode.

In one embodiment of the present invention, the apparatus is executed periodically.

In one embodiment of the present invention, there is provided an apparatus for managing a time series database, comprising: a storage module configured to store the collected data values in the time series database according to the method described above; and a reading module configured to, in response to a query operation to the time series database, read data from the time series database based on a data storage structure corresponding to the selected storage mode.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing a time series database, comprising:
monitoring multiple operations that access the time series database, so as to identify types of the multiple operations, the types of the multiple operations comprising at least one of a query type and an insert type;
with respect to a storage mode among multiple storage modes, obtaining estimated access costs from a cost model repository, the estimated access costs associated with the multiple operations accessing the time series database based on the operation types;
selecting a storage mode, from a storage mode repository including a plurality of storage modes each corresponding to a different application environment differentiated based on data generation characteristics, to reduce resource overhead related to storing and querying data collected from a plurality of sensors based on collection point amount values and data collecting frequency values measured from an application environment of the different application environments, the selected storage mode corresponding to a minimum access cost for the operation types accessing the time series database dictated by a particular application environment; and
during a predetermined time period, adjusting the time series database according to history operations involving the collection point amount values and the data collecting frequency values stored in the selected storage mode to reduce memory utilization.

2. The method according to claim 1, further comprising:
monitoring status information of a computer device running the time series database; and
revising an access cost based on the status information.

3. The method according to claim 2, wherein the multiple storage modes at least comprise any of:
a group storage mode: based on groups resulting from dividing multiple measurement points by a measurement time period, storing into at least one group data blob data values that are collected at the multiple measurement points during the time period; and
a high-frequency storage mode: storing into at least one high-frequency data blob data values that are collected at a measurement point during a time period.

4. The method according to claim 2, wherein the obtaining access costs associated with the multiple operations accessing the time series database based on the types comprises:
calculating the access costs according to a cost model corresponding to the multiple storage modes, based on the types.

5. The method according to claim 4, wherein the calculating the access costs according to a cost model corresponding to the multiple storage modes comprises at least one of:
calculating the access costs based on a query cost model in response to a first part of operations among the multiple operations belonging to the query type, wherein the query cost model describes the access costs of performing query operations to the database; and
calculating the access costs based on an insert cost model in response to a second part of operations among the multiple operations belonging to the insert type, wherein the insert cost model describes the access costs of performing insert operations to the database.

6. The method according to claim 5, wherein the calculating the costs based on a query cost model in response to a first part of operations among the multiple operations belonging to the query type comprises:
extracting from the first part of operations an amount of multiple measurement points associated with the first part of operations and an amount of multiple query time points, wherein the first part of operations represent operations of querying in the time series database data values collected from the multiple measurement points at the multiple query time points; and estimating the costs at least based on the amount of the multiple measurement points and the amount of the multiple query time points according to the query cost model.

7. The method according to claim 5, the calculating the costs based on an insert cost model in response to a second part of operations among the multiple operations belonging to the insert type comprises:

extracting from the second part of operations the sampling frequency f of inserting data into the database which is associated with the second part of operations, and an amount of measurement points associated with the sampling frequency f, wherein the second part of operations represent inserting data values that are collected from the measurement points into the time series database at the frequency f; and estimating the costs at least based on the sampling frequency f and the amount according to the query cost model.

8. The method according to claim 3, wherein:

in the group storage mode, at least identifiers of measurement points in the group, the collected data values and time offsets are stored in a data node of one of the at least one group data blob; and in the high-frequency storage mode, at least the collected data values are stored in a data node of one of the at least one high-frequency data blob.

9. The method according to claim 4, wherein the query cost model and the insert cost model respectively comprise:

cost models corresponding to the group storage mode and the high-frequency storage mode, respectively.

10. The method according to claim 1, wherein the method is executed periodically.

11. A method for managing a time series database, comprising:

storing the collected data values into the time series database according to a method as recited in claim 1; and in response to a query operation to the time series database, reading data from the time series database based on a data storage structure corresponding to the selected storage mode.

12. An apparatus for managing a time series database, comprising:

a monitoring module configured to monitor multiple operations that access the time series database, so as to identify types of the multiple operations, the types of the multiple operations comprising at least one of a query type and an insert type;

an obtaining module configured to, with respect to a storage mode among multiple storage modes, obtain estimated access costs from a cost model repository, the estimated access costs associated with the multiple operations accessing the time series database based on the operation types;

a selecting module configured to select a storage mode, from a storage mode repository including a plurality of storage modes each corresponding to a different application environment differentiated based on data generation characteristics, to reduce resource overhead related to storing and querying data collected from a plurality of sensors based on collection point amount values and data collecting frequency values measured from an application environment of the different application environments, the selected storage mode corresponding to a minimum access cost for the operation types accessing the time series database dictated by a particular application environment; and a storage module configured to, during a predetermined time period, adjust the time series database according to history operations involving the collection point amount values and the data collecting frequency values stored in the selected storage mode to reduce memory utilization.

13. The apparatus according to claim 12, further comprising:

a monitoring module configured to monitor status information of a computer device running the time series database, and revise an access cost based on the status information.

14. The apparatus according to claim 13, wherein the multiple storage modes at least comprise any of:

a group storage mode: based on groups resulting from dividing multiple measurement points by a measurement time period, storing into at least one group data blob data values that are collected at the multiple measurement points during the time period; and a high-frequency storage mode: storing into at least one high-frequency data blob data values that are collected at a measurement point during a time period.

15. The apparatus according to claim 13, wherein the obtaining module comprises:

a calculating module configured to calculate the access costs according to a cost model corresponding to the multiple storage modes, based on the types.

16. The apparatus according to claim 15, wherein the calculating module comprises at least one of:

a first calculating module configured to calculate the access costs based on a query cost model in response to a first part of operations among the multiple operations belonging to the query type, wherein the query cost model describes the access costs of performing query operations to the database; and a second calculating module configured to calculate the access costs based on an insert cost model in response to a second part of operations among the multiple operations belonging to the insert type, wherein the insert cost model describes the access costs of performing insert operations to the database.

17. The apparatus according to claim 16, wherein the first calculating module comprises:

a first extracting module configured to extract from the first part of operations an amount of multiple measurement points associated with the first part of operations and an amount of multiple query time points, wherein the first part of operations represent operations of querying in the time series database data values collected from the multiple measurement points at the multiple query time points; and a first estimating module configured to estimate the costs at least based on the amount of the multiple measurement points and the amount of the multiple query time points according to the query cost model.

18. The apparatus according to claim 16, the second calculating module comprises:

a second extracting module configured to extract from the second part of operations the sampling frequency f of inserting data into the database which is associated with the second part of operations, and an amount of measurement points associated with the sampling frequency f, wherein the second part of operations represent inserting data values that are collected from the measurement points into the time series database at the frequency f; and a second estimating module configured to estimate the costs at least based on the sampling frequency f and the amount according to the query cost model.

19. The apparatus according to claim 14, wherein in the group storage mode, at least identifiers of measurement points in the group, the collected data values and time offsets are stored in a data node of one of the at least one group data blob; and in the high-frequency storage mode, at least the collected data values are stored in a data node of one of the at least one high-frequency data blob.

20. The apparatus according to claim 15, wherein the query cost model and the insert cost model respectively comprise:

cost models corresponding to the group storage mode and the high-frequency storage mode, respectively.

* * * * *